United States Patent Office 2,865,930
Patented Dec. 23, 1958

2,865,930
ETHERS AND THIOETHERS OF KOJIC ACID AND PREPARATION THEREOF

Jean Metivier, Arpajon, and Roger Boesch, Paris, France, assignors to Societe des Usines Chimiques Rhone-Poulenc, Paris, France, a corporation of France No Drawing. Application December 19, 1955
Serial No. 553,712

Claims priority, application France December 23, 1954

9 Claims. (Cl. 260—345.9)

This invention has for its objects to provide new ethers and thioethers, processes for their preparation and useful compositions containing one or more of the new compounds.

The new ethers and thioethers of the present invention may be represented by the general formula:

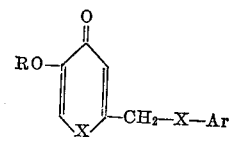

I wherein R represents an alkyl group, X represents an oxygen atom or the group NR' in which R' represents a hydrogen atom or a lower alkyl group such as methyl or ethyl, Y represents an atom of oxygen or of sulphur and Ar represents an aryl group such as phenyl or naphthyl which optionally may be substituted by lower alkyl, e. g., methyl and ethyl, lower alkoxy, e. g., methoxy and ethoxy, lower hydroxyalkyl, e. g., hydroxymethyl, or nitro groups or by halogen atoms. By the term "lower" is meant that the group contains not more than 4 carbon atoms.

According to a feature of the invention, these new compounds may be obtained by the action of an aromatic compound of the general formula:

$$H-Y-Ar$$

II (Ar and Y as hereinbefore defined) on a compound of the general formula:

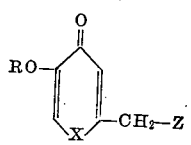

III wherein Z represents the residue of a reactive ester such as a halogen atom or a sulphuric or sulphonic ester group, and X and R are as hereinbefore defined. The reaction is preferably carried out in an organic solvent medium and more particularly in a solvent selected from the group of aliphatic alcohols and ketones in the presence of a basic condensing agent. It is convenient to operate at a temperature between 50–100° C., if necessary at the boiling temperature of the solvent. An alkali metal alcoholate or carbonate is advantageously used as the condensing agent.

According to a further feature of the invention, these new compounds may be prepared by the alkylation of compounds of the general formula:

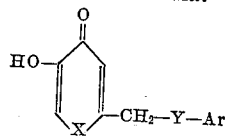

IV by the application of known methods for the alkylation of phenols.

According to yet further features of the invention, the aforesaid new compounds of general Formula I in which X represents N—R' may be prepared from compounds of general Formula I in which X=O by the action of ammonia or of an amine or, where R' represents an alkyl group, from corresponding compounds in which R' represents a hydrogen atom by alkylation using known methods.

These new ethers and thioethers of general Formula I have been found to be of interest as plant-growth regulating agents and as systemic fungicides. For this latter purpose they are particularly active against the anthracnose of beans (colletotrichum lindemuthianum) and the mildew of vines. The compounds of this invention are normally used in association with a diluent in such forms as powders, sprays, aerosols, emulsions or solutions in organic or aqueous organic media. In the case of aqueous emulsions it is preferred to add a wetting, dispersing or emulsifying agent of the ionic or non-ionic type, especially the latter which are not affected by electrolytes. The emulsion type of formulation is preferably made up as a self-emulsifying concentrate containing the active substance dissolved in the dispersing agent or in a solvent compatible with that dispersing agent, the composition being made ready for use by the simple addition of water. The new compounds may also be employed in mixtures with synergistic substances or with other growth regulators or fungicides. Plant-growth regulating compositions and fungicidal compositions containing one or more compounds of general Formula I are included within the scope of the invention.

The following examples will serve to illustrate the invention but are not to be regarded as limiting it in any way.

EXAMPLE I 2-chloromethyl-5-methoxy-4-pyrone (17.4 g.) is dissolved in ethanol (150 cc.), 4-chlorophenol (13.1 g.) in 18% potassium ethylate (47.6 cc.) is added and the mixture is heated for 2 hours under reflux with continuous and thorough agitation. The precipitate of potassium chloride is filtered off and concentration and cooling of the filtrate yields 2-(4'-chlorophenoxymethyl)-5-methoxy-4-pyrone (12.1 g.), M. P. 128° C. after recrystallisation from 60% ethanol.

EXAMPLE II 2-chloromethyl-5-methoxy-4-pyrone (8.7 g.) and 4-chlorophenol (7.7 g.) are added to an agitated suspension of potassium carbonate (13.8 g.) and sodium iodide (0.75 g.) in acetone (150 cc.) and the mixture is heated for 4 hours under reflux. The mineral precipitate is filtered off from the hot mixture, and the acetone solution on concentration and cooling deposits 2-(4'-chlorophenoxymethyl)-5-methoxy-4-pyrone (10.8 g.), which on recrystallisation from 60% ethanol is obtained as white platelets, M. P. 128° C.

EXAMPLE III 2-chloromethyl-5-methoxy-4-pyrone (8.7 g.) is dissolved with agitation in ethanol (80 cc.), 2:4-dichlorophenol (8.3 g.) in 19% potassium ethylate (22.6 cc.) is added and the mixture is heated for 2 hours under reflux. Proceeding as described in Example I. 2-(2':4'-dichlorophenoxymethyl)-5-methoxy-4-pyrone (8.3 g.) is obtained, M. P. 128° C. after recrystallisation from 60% ethanol.

EXAMPLE IV 2-chloromethyl-5-methoxy-4-pyrone (17.45 g.) and 2:4-dichlorophenol (19.5 g.) are added to a suspension of potassium carbonate (27.6 g.) and sodium iodide (1.5 g.) in acetone (200 cc.). After 4 hours heating under reflux the mineral matter is filtered off and there is isolated from the acetone solution 2-(2':4'-dichlorophenoxymethyl)-5-methoxy-4-pyrone (26.5 g.), M. P. 127–128° C. after recrystallisation from 60% ethanol.

EXAMPLE V

A mixture of 2-chloromethyl-5-methoxy-4-pyrone (8.7 g.) in ethanol (80 cc.) and 2:4:6-trichlorophenol (10 g.) in 19% potassium ethylate (22.6 cc.) is heated for 2 hours under reflux. The potassium chloride precipitate is filtered off and on cooling the alcoholic solution there is precipitated 2-(2':4':6'-trichlorophenoxymethyl)-5-methoxy-4-pyrone (14.6 g.) which, on recrystallisation from ethanol, is obtained as white needles, M. P. 144° C.

EXAMPLE VI 2-chloromethyl-5-methoxy-4-pyrone (8.7 g.) is dissolved in ethanol (80 cc.), 6-chloro-o-cresol (7.3 g.) in 19% potassium ethylate (22.6 cc.) is added and the mixture is heated for 2 hours under reflux with continuous agitation. After separation of potassium chloride, the filtrate is concentrated in vacuo. There is thus obtained 2-(2'-methyl-6'-chlorophenoxy-methyl)-5-methoxy-4-pyrone (10.8 g.), M. P. 74° C. after recrystallisation from 60% ethanol.

EXAMPLE VII

Potassium carbonate (27.6 g.) and sodium iodide (1.5 g.) are suspended in acetone (160 cc.). 2-chloromethyl-5-methoxy-4-pyrone (17.45 g.) and 6-chloro-o-cresol (17.1 g.) are then added and the mixture is heated for 4 hours under reflux. The mineral precipitate is filtered off from the hot mixture and, on concentration, the acetone solution yields 2-(2'-methyl-6'-chlorophenoxymethyl)-5-methoxy-4-pyrone (27.3 g.), M. P. 73–74° C. after recrystallisation from 60% ethanol.

EXAMPLE VIII

Potassium carbonate (13.8 g.) and sodium iodide (0.75 g.) are suspended in acetone (160 cc.), 2-chloromethyl-5-methoxy-4-pyrone (8.7 g.) and 4-chloro-o-cresol (8.55 g.) are added and the mixture is heated for 3 hours under reflux. The mineral precipitate is filtered off and the acetone solution is concentrated. On crystallisation 2-(2'-methyl-4'-chlorophenoxymethyl)-5-methoxy-4-pyrone (13.9 g.) is obtained, M. P. 113.5° C. after recrystallisation from 60% ethanol.

EXAMPLE IX 2-chloromethyl-5-methoxy-4-pyrone (7 g.) and pentachlorophenol (12.8 g.) are added to a suspension of potassium carbonate (11 g.) and sodium iodide (0.6 g.) in acetone (160 cc.). After 4 hours heating under reflux, the reaction mixture is cooled and the precipitate formed is filtered off, washed with water and recrystallised from benzene. 2-Pentachlorophenoxy-methyl-5-methoxy-4-pyrone (12.8 g.), M. P. 176–178° C. is thus obtained.

EXAMPLE X 2-chloromethyl-5-methoxy-4-pyrone (8.7 g.) is dissolved in ethanol (80 cc.), 4-chlorothiophenol (7.4 g.) in 19% potassium ethylate (22.6 cc.) is added and the mixture is heated for 2 hours under reflux. After separation of potassium chloride, there is isolated from the alcoholic solution 2-(4'-chlorophenylmercaptomethyl)-5-methoxy-4-pyrone (8.9 g.), M. P. 101° C. after recrystallisation from 60% ethanol.

EXAMPLE XI 2-(4-chlorophenoxymethyl)-5-methoxy-4-pyrone (11.3 g.) and ammonia (d=0.92; 60 cc.) are heated in a sealed tube for 2–3 hours at 99° C. There is thus obtained 2-(4'-chlorophenoxymethyl)-5-methoxy-4-pyridone (10.9 g.), M. P. 188° C. after recrystallisation from ethanol.

Treatment of the pyridone with aqueous hydrochloric acid yields a hydrochloride, M. P. 191–193° C. after recrystallisation from ethanol.

EXAMPLE XII 2-(2-methyl-6-chlorophenoxymethyl)-5-methoxy-4-pyrone (8 g.) and ammonia (d=0.92; 60 cc.) are heated in a sealed tube for 2–3 hours at 99° C. There is thus obtained 2-(2'-methyl-6'-chlorophenoxymethyl)-5-methoxy-4-pyridone (4.4 g.), M. P. 156–157° C. after recrystallisation from 40% ethanol.

EXAMPLE XIII

Potassium carbonate (27.6 g.) and sodium iodide (1.4 g.) are suspended in acetone (180 cc.). 2-chloromethyl-5-methoxy-4-pyrone (17.45 g.) and phenol (11.3 g.) are then added and the mixture is heated under reflux for 4 hours. The mineral precipitate is filtered off from the hot mixture and, on concentration, the acetone solution yields 2-phenoxymethyl-5-methoxy-4-pyrone (17.7 g.), M. P. 126° C. after recrystallisation from ethanol.

EXAMPLE XIV 2-chloromethyl-5-methoxy-4-pyrone (17.45 g.) and o-chlorophenol (15.4 g.) are added to a stirred suspension of potassium carbonate (27.6 g.) and sodium iodide (1.4 g.) in acetone (150 cc.), and the mixture is then heated under reflux for 4 hours. The mineral precipitate is filtered off from the hot mixture and, on concentration and cooling, the acetone solution yields 2-(2'-chlorophenoxymethyl)-5-methoxy-4-pyrone (25.4 g.), M. P. 133° C. after recrystallisation from methanol.

EXAMPLE XV 2-chloromethyl-5-methoxy-4-pyrone (17.4 g.) and m-cresol (12.9 g.) are added to a suspension of potassium carbonate (27.6 g.) and sodium iodide (1.4 g.) in acetone (180 cc.), and then the mixture is heated for 3 hours under reflux. The mineral matter is filtered off, and from the acetone solution there is obtained 2-(3'-methylphenoxymethyl)-5-methoxy-4-pyrone (12.5 g.), M. P. 79–80° C. after recrystallisation from ethanol.

EXAMPLE XVI

Proceeding as described in Example XV, there is obtained by condensing 2-chloromethyl-5-methoxy-4-pyrone (17.4 g.) and p-cresol (12.9 g.), 2-(4'-methylphenoxymethyl)-5-methoxy-4-pyrone (17.5 g.), M. P. 108° C. after recrystallisation from methanol.

EXAMPLE XVII 2-chloromethyl-5-methoxy-4-pyrone (17.45 g.) and 2:4-dimethylphenol (14 g.) are added to a suspension of potassium carbonate (27.6 g.) and sodium iodide (1.4 g.) in acetone (160 cc.). After heating for 4 hours under reflux, the mineral matter is filtered off and, on concentration, the acetone solution yields 2-(2':4'-dimethylphenoxymethyl)-5-methoxy-4-pyrone (22.5 g.), M. P. 92.5–93° C. after recrystallisation from methanol.

EXAMPLE XVIII

Potassium carbonate (27.6 g.) and sodium iodide (1.4 g.) are suspended in acetone (160 cc.) 2-chloromethyl-5-methoxy-4-pyrone (17.45 g.) and 2:5-dimethylphenol (14.6 g.) are then added and the mixture is heated under reflux for 4 hours. After treatment of the reaction mixture as described in Example XVII there is obtained 2-(2':5'-dimethylphenoxymethyl)-5-methoxy-4-pyrone (23 g.), M. P. 92.5–93° C. after recrystallisation from 60% ethanol.

EXAMPLE XIX

A stirred mixture of 2-chloromethyl-5-methoxy-4-pyrone (17.45 g.), 3:4-dimethylphenol (14.6 g.), potassium carbonate (27.6 g.) and sodium iodide (1.4 g.) in acetone (160 cc.) is heated under reflux for 4 hours.

The mineral matter is filtered off and, on concentration, the acetone solution yields 2-(3':4'-dimethylphenoxymethyl)-5-methoxy-4-pyrone (23.2 g.), M. P. 122° C. after recrystallisation from ethanol.

EXAMPLE XX

Proceeding as described in Example XIX, 2-chloromethyl-5-methoxy-4-pyrone (17.45 g.) is condensed with 3:5-dimethylphenol (14.6 g.). There is thus obtained 2-(3':5'-dimethylphenoxymethyl)-5-methoxy-4-pyrone (12.5 g.), M. P. 57–58° C. after recrystallisation from acetone.

EXAMPLE XXI

Proceeding as described in Example XIX, 2-chloromethyl-5-methoxy-4-pyrone (14 g.) is condensed with 3:5-dimethyl-4-chlorophenol (14.2 g.). There is thus obtained 2-(3':5'-dimethyl-4-chlorophenoxymethyl)-5-methoxy-4-pyrone (25.2 g.), M. P. 148° C. after recrystallisation from ethanol.

EXAMPLE XXII 2-chloromethyl-5-methoxy-4-pyrone (17.45 g.) and 2-nitrophenol (16.7 g.) are added to a suspension of potassium carbonate (27.6 g.) and sodium iodide (1.4 g.) in acetone (230 cc.). After heating for 4 hours under reflux, the reaction mixture is cooled; the precipitate formed is filtered off, washed with water and then recrystallised from ethanol. 2-(2'-nitrophenoxymethyl)-5-methoxy-4-pyrone (15.2 g.), M. P. 157–157.5° C., is thus obtained.

EXAMPLE XXIII

Proceeding as described in Example XXII, 2-chloromethyl-5-methoxy-4-pyrone (17.45 g.) is condensed with 4-nitrophenol (16.7 g.) to give 2-(4'-nitrophenoxymethyl)-5-methoxy-4-pyrone (17.5 g.), M. P. 149.5–150° C. after recrystallisation from ethanol.

The following table consists of examples made by the general procedure indicated above: all quantities are in grams unless otherwise stated and temperatures are in ° centigrade.

Table

| Example No. | Quantity of 2-chloromethyl-5-methoxy-4-pyrone | Second Reagent and Quantity | Quantity of Potassium Carbonate | Quantity of Sodium Iodide | Quantity of Acetone (cc.) | Reflux time (hours) | Product | Yield | M. Pt., degrees | Recrystallisation Solvent |
|---|---|---|---|---|---|---|---|---|---|---|
| 24 | 17.4 | 12.9 of o-cresol | 27.6 | 1.4 | 180 | 4 | 2-(2'-methyl-phenoxymethyl)-5-methoxy-4-pyrone. | 19.5 | 115 | Ethanol. |
| 25 | 17.45 | 21.1 of 4-cyclohexyl-phenol. | 27.6 | 1.4 | 180 | 4 | 2-(4'-cyclohexyl-phenoxymethyl)-5-methoxy-4-pyrone. | 22 | 146 | Do. |
| 26 | 17.45 | 16.3 of 4-isopropyl-phenol. | 27.6 | 1.4 | 180 | 4 | 2-(4'-isopropyl-phenoxymethyl)-5-methoxy-4-pyrone. | 20.5 | 97 | Do. |
| 27 | 17.45 | 15.9 of β-naphthol. | 27.6 | 1.4 | 280 | 3 | 2-(β-naphthoxy-methyl)-5-methoxy-4-pyrone. | 16.5 | 168 | Ethanol, 80%. |
| 28 | 17.45 | 15.4 of m-chlorophenol. | 27.6 | 1.4 | 180 | 4 | 2-(3'-chlorophenoxymethyl)-5-methoxy-4-pyrone. | 18.5 | 80 | |
| 29 | 7.3 | 6.1 of 2:3-dimethylphenol. | 11.5 | 0.6 | 90 | 3 | 2-(2':3'-dimethylphenoxymethyl)-5-methoxy-4-pyrone. | 7.3 | 118 | Ethanol. |
| 30 | 8.7 | 6.2 of 2:6-dimethylphenol. | 11.5 | 0.6 | 90 | 3 | 2-(2':6'-dimethylphenoxymethyl)-5-methoxy-4-pyrone. | 7.5 | 87–88 | Aqueous Acetone. |
| 31 | 8.7 | 8 of 2:4:6-trimethylphenol. | 13.8 | 0.7 | 90 | 4 | 2-(2':4':6'-trimethylphenoxymethyl)-5-methoxy-4-pyrone. | 7 | 103–103.5 | Ethanol. |
| 32 | 17.45 | 17.1 of 3 methyl-4-chlorophenol. | 27.6 | 1.4 | 180 | 4 | 2-(3'-methyl-4'-chlorophenoxymethyl)-5-methoxy-4-pyrone. | 21.5 | 112 | Do. |
| 33 | 21 | 19.9 of 2-chloro 4-methyl-phenol. | 27.6 | 1.4 | 180 | 4 | 2-(2'-chloro-4'-methylphenoxymethyl)-5-methoxy-4-pyrone. | 24.5 | 122 | Do. |
| 34 | 17.4 | 21.2 of 2-methyl-4:6-dichlorophenol. | 27.6 | 1.4 | 180 | 4 | 2-(2'-methyl-4':6'-dichlorophenoxy-methyl)-5-methoxy-4-pyrone. | 21 | 122 | Do. |
| 35 | 17.4 | 21.2 of 2:6-dichloro-4-methylphenol. | 27.6 | 1.4 | 180 | 4 | 2-(2':6'-dichloro-4'-methylphenoxymethyl)-5-methoxy-4-pyrone. | 20 | 114 | Do. |
| 36 | 7.7 | 8.5 of 2:4-dichloro-6 hydroxymethylphenol. | 27.6 | 1.4 | 180 | 4 | 2-(2':4'-dichloro-6'-hydroxymethylphenoxymethyl)-5-methoxy-4-pyrone. | 8.1 | 140 | Do. |
| 37 | 13.9 | 15 of 2:4-dimethyl-6-chlorophenol. | 27.6 | 1.4 | 180 | 4 | 2-(2':4'-dimethyl-6'-chlorophenoxymethyl)-5-methoxy-4-pyrone. | 16 | 102 | Do. |
| 38 | 14.8 | 16.2 of 2-chloro-4:6-di-(hydroxymethyl)-phenol. | 27.6 | 1.4 | 180 | 4 | 2-(2'-chloro-4':6'-di[hydroxymethyl]-phenoxy-methyl)-5-methoxy-4-pyrone. | 11.5 | 119–120 | Ethanol, 50%. |
| 39 | 10.5 | 12.4 of 2:6-di-(hydroxymethyl)-4-chlorophenol. | 16.5 | 0.85 | 150 | 4 | 2-(2':6'-di[hydroxymethyl]-4'-chloro-phenoxymethyl)-5-methoxy-4-pyrone. | 10.5 | 140 | Ethanol. |
| 40 | 17.4 | 18.4 of 2:6-di-(hydroxymethyl)-4-methyl-phenol. | 16.5 | 0.85 | 150 | 4 | 2-(2':6'-di[hydroxymethyl]-4'-methyl-phenoxymethyl)-5-methoxy-4-pyrone. | 16.6 | 136 | Do. |
| 41 | 10.5 | 9.2 of 2:5-di-methyl-4-hydroxymethyl-phenol. | 16.5 | 0.85 | 150 | 4 | 2-(2':5'-dimethyl-4'-hydroxymethyl-phenoxymethyl)-5-methoxy-4-pyrone. | 11 | 148 | Do. |
| 42 | 7.7 | 6.8 of 3:4-di-methyl-6-hydroxymethyl-phenol. | 16.5 | 0.85 | 150 | 4 | 2-(3':4'-dimethyl-6-hydroxymethyl-phenoxymethyl)-5-methoxy-4-pyrone. | 7.8 | 147 | Do. |
| 43 | 17.4 | 12.4 of 2-hydroxymethyl-phenol. | 27.6 | 1.4 | 180 | 4 | 2-(2'-hydroxymethyl-phenoxymethyl)-5-methoxy-4-pyrone. | 17 | 112 | Do. |
| 44 | 10.5 | 8.3 of 2-hydroxymethyl-4-methyl phenol. | 27.6 | 1.4 | 180 | 4 | 2-(2'-hydroxymethyl-4'-methyl-phenoxymethyl)-5-methoxy-4-pyrone. | 9 | 127–127.5 | Do. |
| 45 | 17.4 | 13.8 of 2-methoxy-4-methyl-phenol. | 27.6 | 1.4 | 180 | 4 | 2-(2'-methoxy-4'-methyl-phenoxymethyl)-5-methoxy-4-pyrone. | 15.5 | 81 | Do. |

Table—Continued

| Example No. | Quantity of 2-chloromethyl-5-methoxy-4-pyrone | Second Reagent and Quantity | Quantity of Potassium Carbonate | Quantity of Sodium Iodide | Quantity of Acetone (cc.) | Reflux time (hours) | Product | Yield | M. Pt., degrees | Recrystallisation Solvent |
|---|---|---|---|---|---|---|---|---|---|---|
| 46 | 17.4 | 13.8 of 2-methoxy-5-methyl-phenol. | 27.6 | 1.4 | 180 | 4 | 2-(2'-methoxy-5'-methyl-phenoxymethyl)-5-methoxy-4-pyrone. | 16 | 124 | Ethanol. |
| 47 | 9.4 | 7.5 of 2-methoxy-6-methyl-phenol. | 27.6 | 1.4 | 180 | 4 | 2-(2'-methoxy-6'-methyl-phenoxymethyl)-5-methoxy-4-pyrone. | 9.5 | 100-101 | Ethanol, 50%. |
| 48 | 17.4 | 12.4 of 3-methoxy-phenol. | 27.6 | 1.4 | 180 | 4 | 2-(3'-methoxy-phenoxymethyl)-5-methoxy-4-pyrone. | 19.5 | 75 | Ethanol. |

EXAMPLE XLIX

The procedure of Example XLIII is repeated using 18.8 g. of 2-chloromethyl-5-ethoxy-4-pyrone instead of the corresponding 5-methoxy compound. There is thus obtained 16.5 g. of 2-(2'-hydroxymethylphenoxy-methyl)-5-ethoxy-4-pyrone, melting at 139° C. after recrystallisation from ethanol.

EXAMPLE L

A mixture of 16.3 g. of 2:4-dichlorophenol, 13.8 g. of potassium carbonate, 31.8 g. of the p-toluene sulphonate of 2-hydroxymethyl-5-methoxy-4-pyrone and 200 cc. of acetone is stirred for 1½ hours and then refluxed for half an hour. After separation of the salt formed by filtration there is obtained 19.5 g. of 2-(2':4'-dichlorophenoxymethyl)-5-methoxy-4-pyrone, melting at 128° C.

EXAMPLE LI 200 g. of 2-(2'-methyl-4'-chlorophenoxymethyl)-5-methoxy-4-pyrone is intimately mixed with 600 cc. of the commercial wetting agent sold under the name Tween 80, and the mixture diluted with 200 litres of water with vigorous stirring. The resulting solution is used for protecting plants such as tomatoes and beans against fungus growth.

EXAMPLE LII 200 g. of 2-(3':5'-dimethyl-phenoxymethyl)-5-methoxy-4-pyrone is intimately mixed with 1 kg. of talc and 10 g. of the commercial wetting agent sold under the name Tween 80. The resulting powder is sieved to remove particles which do not pass a 100 mesh screen. The resulting powder is suspended in 200 litres of water and used as in Example LI.

EXAMPLE LIII 100 g. of 2-(2':4'-dichloro-phenoxymethyl)-5-methoxy-4-pyrone is dissolved in a mixture of 500 cc. toluene, 20 litres acetone and 100 g. of the commercial wetting agent sold under the name Tween 80. The solution is diluted to 100 litres by addition of water and is employed in spray form as a herbicide.

EXAMPLE LIV 10 cc. of a 1% solution in dimethylformamide of 2-(2':4'-dichloro-phenoxymethyl)-5-methoxy-4-pyrone are diluted with 10 litres of water. The solution thus obtained is used for soaking the stems of plants, e. g. tomatoes, to enhance root formation.

EXAMPLE LV

The procedure of Example LIII is followed using 100 g. of 2-(4'-chloro-phenoxymethyl)-5-methoxy-4-pyrone.

We claim:
1. As a new composition of matter, 2-(2'-methyl-phenoxymethyl)-5-methoxy-4-pyrone.
2. As a new composition of matter, 2-(2',6'-dimethyl-phenoxymethyl)-5-methoxy-4-pyrone.
3. As a new composition of matter, 2-(2'-methyl-4'-chlorophenoxymethyl)-5-methoxy-4-pyrone.
4. As a new composition of matter, 2-(2':4':6'-trimethylphenoxymethyl)-5-methoxy-4-pyrone.
5. As a new composition of matter, 2-(2':4'-dimethyl-6'-chlorophenoxymethyl)-5-methoxy-4-pyrone.
6. A compound of the general formula:

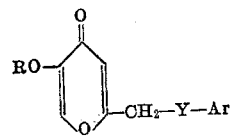

where R is a lower alkyl group, Y is selected from the group consisting of oxygen and sulphur, and Ar is a group selected from the class consisting of phenyl, lower-alkyl-substituted phenyl, lower-alkoxy-substituted phenyl, lower-hydroxyalkyl-substituted phenyl, nitrophenyl and chlorophenyl.

7. A process for the production of a compound of the general formula:

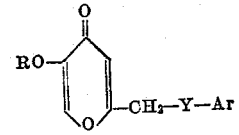

where R is a lower alkyl group, Y is selected from the group consisting of oxygen and sulphur, and Ar is a group selected from the class consisting of phenyl, lower-alkyl-substituted phenyl, lower-alkoxy-substituted phenyl, lower-hydroxyalkyl-substituted phenyl, nitrophenyl and chlorophenyl, which comprises heating a compound of the general formula:

$$H—Y—Ar$$

with a compound of the formula:

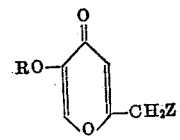

where Z is selected from the class consisting of chlorine and the p-toluene sulphonic acid residue.

8. A process according to claim 7 wherein Z is a chlorine atom and the reaction is effected in the presence of a solvent selected from the group consisting of aliphatic alcohols and ketones and a basic condensing agent selected from the class consisting of alcoholates and carbonates of alkali metals.

9. A process according to claim 7 wherein Z is chlorine and the reaction is effected in the presence of an aliphatic ketone, an alkali metal carbonate and an alkali metal iodide.

References Cited in the file of this patent
Armit et al.: J. Chem. Soc., pp. 3023-31 (1931).